United States Patent [19]

Zoltan et al.

[11] 3,960,691
[45] June 1, 1976

[54] TACTICAL RATE SENSOR

[75] Inventors: Bart J. Zoltan, Emerson; John L. Evans, Oakland, both of N.J.

[73] Assignee: The Singer Company, Little Falls, N.J.

[22] Filed: Jan. 31, 1975

[21] Appl. No.: 545,995

[52] U.S. Cl. .......................... 204/195 R; 204/1 T; 73/505; 73/516 LM
[51] Int. Cl.² .................. G01N 27/46; G01P 15/00; G01P 15/08
[58] Field of Search ............... 204/1 T, 195 R, 242, 204/279; 73/505, 516 LM

[56] References Cited
UNITED STATES PATENTS

| 1,319,036 | 10/1919 | Barus | 73/516 LM |
|---|---|---|---|
| 2,713,726 | 7/1955 | Dixson | 73/516 LM |
| 2,896,095 | 7/1959 | Reeds et al. | 204/242 |
| 3,149,310 | 9/1964 | Stewart | 204/242 |
| 3,164,023 | 1/1965 | Holderer | 73/516 LM |
| 3,209,255 | 9/1965 | Estes et al. | 204/195 R |
| 3,242,729 | 3/1966 | Keller | 204/195 R |
| 3,260,121 | 7/1966 | Johnston | 73/505 |
| 3,296,113 | 1/1967 | Hansen | 204/242 |
| 3,461,043 | 8/1969 | Guerrant | 204/195 R |
| 3,522,162 | 7/1970 | Davies | 204/149 |

Primary Examiner—T. Tung
Attorney, Agent, or Firm—T. W. Kennedy

[57] ABSTRACT

A rate sensor comprising a glass annulus filled with an electrolytic fluid. A plurality of electrodes in contact with the electrolyte have an electrical field established between them which in turn starts a flow of ions between the electrodes. When the device is rotated about a predetermined axis the flow of ions between certain electrodes is increased. Electronic means connected to output electrodes senses the change in ion flow and determines the rotational rate of the vehicle upon which the sensor is mounted.

6 Claims, 4 Drawing Figures

TACTICAL RATE SENSOR

This invention is related to rate sensors. More particularly, this invention is related to a rotor-less rate sensor that senses the flow of ions in an electrolytic fluid to indicate rate of movement.

BACKGROUND OF THE INVENTION

In co-pending U.S. Patent Application Ser. No. 411,538, filed Oct. 31, 1973, now U.S. Pat. No. 3,910,122, a rotor-less rate sensor that measures angular velocity is described. The means employed therein comprises a moving stream of gas. An ion collector disposed in the stream of ionized gas senses changes by the amount of ions collected. In another co-pending applicaton, U.S. Patent Applicaton Ser. No. 408,313, filed Oct. 23, 1973, now U.S. Pat. No. 3,910,123, there is described a rotor-less angular velocity measuring apparatus wherein a radioactive gas releases ions to an electrode and the number of ions reaching the electode is a measure of the angular velocity of the vehicle upon which the sensor is mounted. These devices teach the measurement of inertial rate without the use of rotors of conventional rate gyros and have application in rate damping, gun sight stabilization and directional control among other applications.

Conventionally, the method of measuring rate was to operate a gyroscope in the captured mode while monitoring the current required to maintain the gyro at null. The measured current in this method is proportional to the applied torque and therefore to gyro rate. The disadvantages of the captured gyro wheel as compared with a rotor-less sensor are numerous. Gyroscopes are difficult and costly to manufacture, primarily because of the high tolerances required in machining and the high degree of skill needed for assembly.

Rotor-less rate sensors as described above, work on the principle of measuring the rate of case experiencing a rotation as it sweeps past an area of ionized gas contained inside the case. The gas catches up to the case with a time constant that is proportional to its density ($\rho$) and inversely proportional to its viscosity ($\mu$). It is desirable to make this $\rho/\mu$ as large as possible. It is apparent that a factor of 30:1 can be gained in going to a liquid and holding the other dimension constant. This gain can either be translated into a smaller device with equal performance or a similar size device with improved characteristics.

The method of ionization by radioactive bombardment is not practical for liquids because of the greatly decreased range of the ionizing radiation.

The electrolytic conduction taught by the present invention is unlike conduction in a metal in that electrons do not flow with the speed of light. Instead, when a field is applied across an electrolyte there is a slow drift of ions through the liquid. The current measured is a measure of the number of ions reaching an electrode per unit time. When a flow is imparted to the fluid in such a manner as to oppose the flow of ions, the measured current decreases. On the other hand, when the flow is with the direction of ion movement the current increases.

BRIEF DESCRIPTION OF THE INVENTION

In a first embodiment of the invention there is provided a glass annulus or toroidal chamber which is filled with an electrolytic fluid. A central electrode is connected to a source of voltage. Situated equi-distant on either side of the central electrode are two output electrodes. All of the electrodes are in contact with fluid within the enclosure or chamber. An equal amount of ions will flow from the central electrode to the output electrode in the quiescent state. That is, when the vehicle upon which the sensor is mounted does not impart a rotary movement to the sensor. However, when a rotary motion is made by the vehicle carrying the sensor one of the output electrodes will have an increased number of ions moving toward it. Since the output electrodes are connected to a difference amplifier the current to the two amplifiers are compared providing the direction and magnitude of rotation of the vehicle. Means are provided in the utilization equipment to measure the rate of rotation.

In a second embodiment of the invention the electrolytic fluid fills a spherical chamber. Three sets of electrodes each set comprising a central electrode connected to a voltage source and two output electrodes connected to a difference amplifier. Each set of electrodes are situated perpendicularly from each other on the periphery of the sphere so as to define three axes (e.g. X, Y and Z). In this embodiment of the invention the utilization equipment can sense the rate in three planes.

Accordingly, it is an object of this invention to provide a rotor-less rate sensor wherein the flow of ions in an electrolytic fluid is indicative of rate.

It is another object of the invention to provide a rotor-less rate sensor that is inexpensive and simple to construct.

It is a further object of this invention to provide a rate sensor employing an electrolytic fluid wherein the rate is sensed along three axes.

These and other objects, features and advantages of the present invention will become apparent from the following description taken in conjunction with the accompanying drawings wherein.

Figure 1:
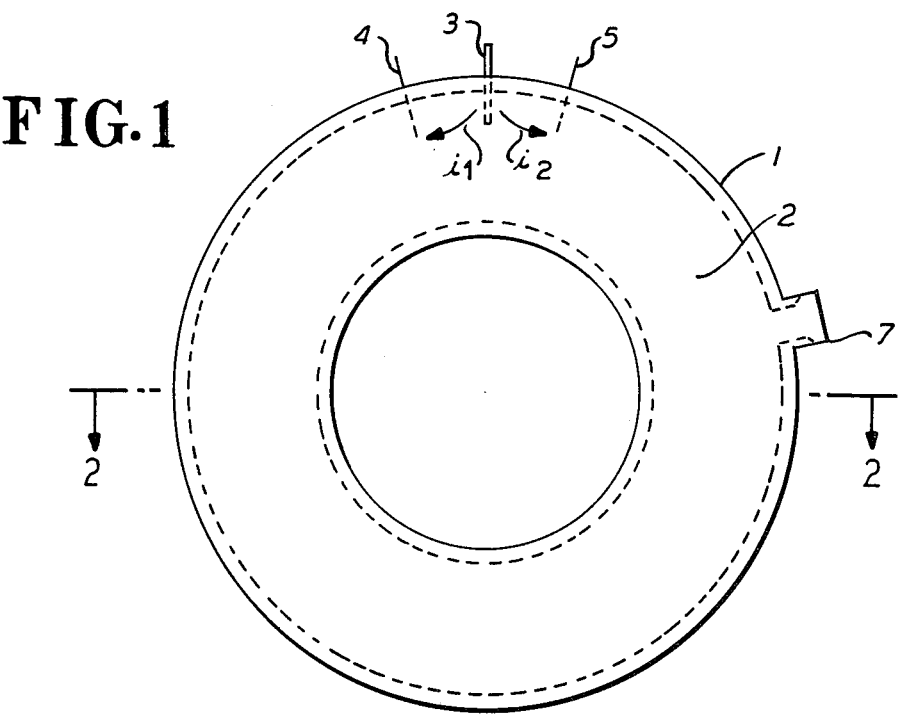
FIG. 1 is a plan view of a first embodiment of the invention showing the annulus or toroidal chamber filled with electrolytic fluid and having a central electrode and two output electrodes mounted on the periphery of the chamber.

Referring now to FIG. 1, reference numberal 1 is annulus or a doughnut shaped vessel which is filled with a low viscosity electrolytic fluid 2 such as a mixture of alcohol and ammonium iodide. A tube 3 serves a dual function. First, it permits the vessel to be filled and secondly, it serves as one of the three electrodes. The other two electrodes 4 and 5 are located on the periphery of the vessel at equal angles from the central electrode 3. All of the electrodes are shown as protruding from the outside pointing inward. However, the three electrodes may be placed on the inside of the glass ring protruding into the liquid from that side, and provide the same function. The bellows 7 located on the periphery of the vessel at a point 90° from the electrodes serves the purpose of allowing expansion of the liquid with temperature change. The location of the bellows is optional.

Figure 2:
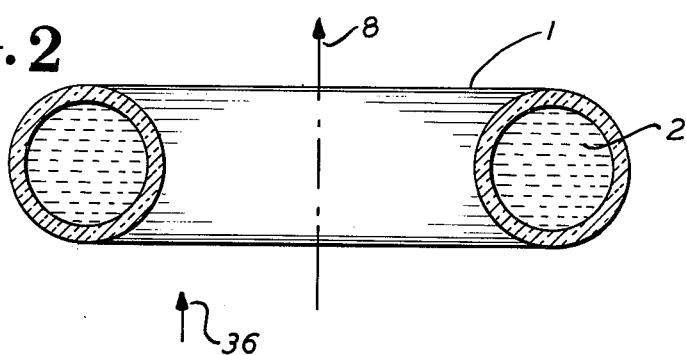
FIG. 2 is a sectional view taken along the line 2—2 of FIG. 1 showing the orientation of the sensing axis.

In FIG. 2 is seen that the sensing axis 8 is perpendicular to the planar surface of the annulus. In Fig. 1, $i_1$ and $i_2$ indicate current flowing into electrodes 4 and 5 respectively. When a rate is applied about axis 8 one of the currents $i_1$ and $i_2$ will increase and the other will decrease.

Figure 3:
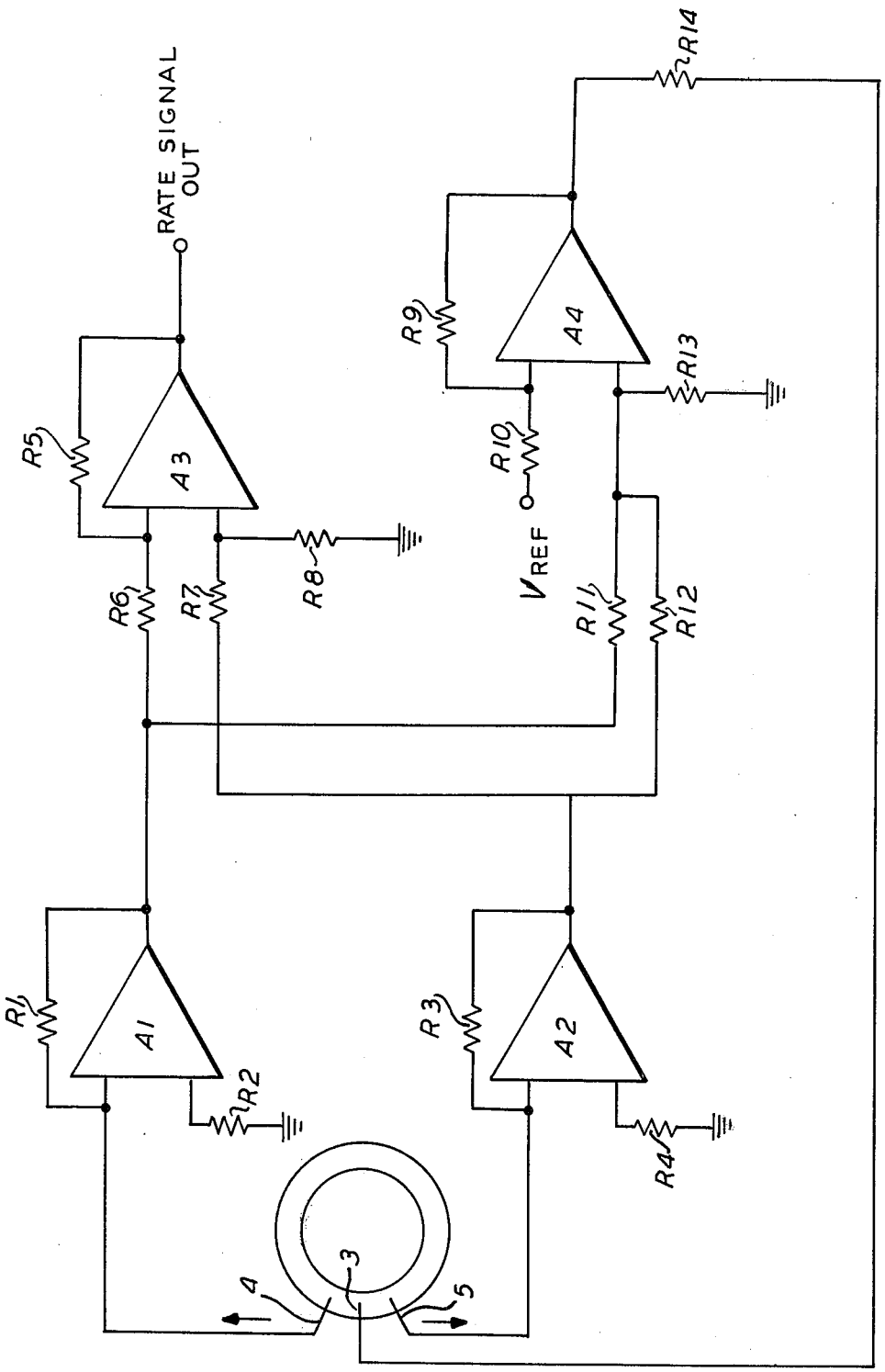
FIG. 3 is a schematic diagram showing the rate sensor difference amplifier and voltage reference source.

Turning to FIG. 3, the electronic circuit for measuring the current flow is shown. Electrode 3 is connected through resistor R 14 to the output of amplifier A4. This output establishes a voltage potential on electrode 3. Electrode 4 is connected to amplifier A1 which has a feedback resistor R1 and input resistor R2. Electrode 5 is connected to amplifier A2 which has an input resistor R4 and feedback resistor R3. The output of amplifier A1 is fed to the input of amplifier A3 through resistor R6 and also to amplifier A4 through resistor R11. The output of amplifier A2 is fed to amplifier A3 through resistor R7 to amplifier A4 via resistor R12. Amplifiers A1 and A2 can be low cost amplifiers because the currents measured are very high (i.e. 10° higher than on the sensors using radioactive decay to ionize gases). Amplifiers $A_1$ and $A_2$ are current-to-voltage amplifiers and their output signals developed across input resistor R8 of amplifier A3 have the function of amplifying the difference voltage between amplifiers $A_1$ and $A_2$ and providing a rate signal output. On the other hand, amplifier $A_4$ develops the signals at the junction of R11, R12 and R13 to provide the sum currents of $i_1 + i_2$, and keeps this sum a fixed constant by feeding back V+ to the central electrode 3. Any deviation from the reference voltage $V_{ref}$ which is applied across R10 to amplifier A4 is also applied to electrode 3. This accomplishes temperature compensation, which may be needed since the electrolytic conduction and therefore the ion velocity under an applied field may vary with temperature.

Figure 4:
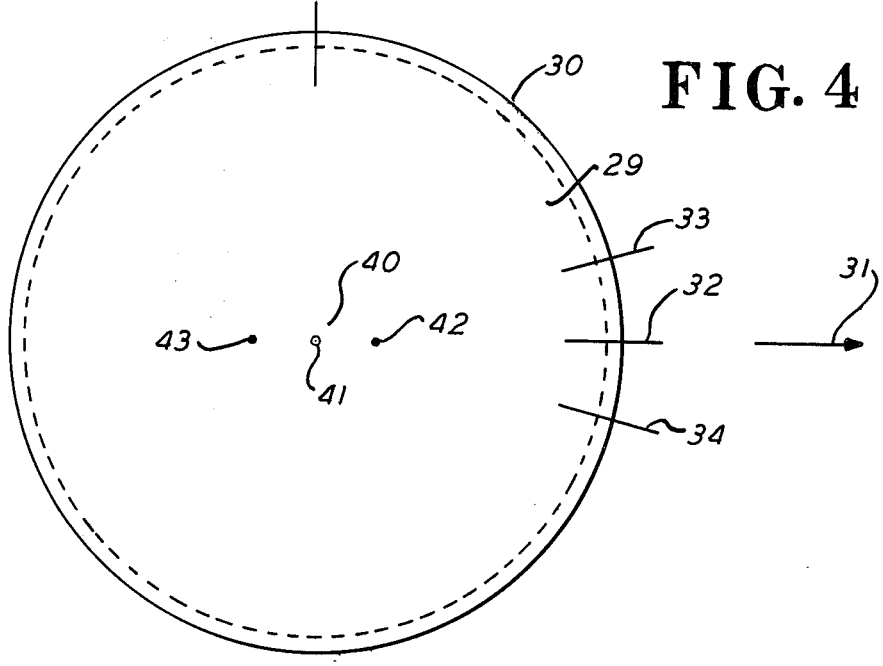
FIG. 4 is a second embodiment of the invention showing a spherical vessel filled with electrolytic fluid and having sets of electrodes placed in three planes or axes perpendicular to each other.

FIG. 4 shows a second embodiment of the invention that provides three axes mutually perpendicular to each other. A glass sphere 30 is filled with an electrolyte 29 as discussed above with FIG. 1. At axis 31 there are a central electrode 32 bordered by equally spaced output electrodes 33 and 34. At axis 36 there are central electrodes 37 and output electrodes 38 and 39 (not shown). Finally, at axis 40 there are central electrode 41 and output electrode 42 and 43. In the embodiment of FIG. 4, rotation in the directon of any one of the three axes, will result in an increase or decrease of ion flow in one of the two collectors of a set. This condition is sensed in the electronic circuit as described with regard to FIG. 3 and used to determine the rate or rotation in all three axes.

From the foregoing it has been shown that the described rate sensor of the invention provides a large signal, is small in size and inexpensive to manufacture and assemble. Its performance is superior due to lower kinematic viscosity to devices which uses gases not liquids. The invention fills the need for a very low cost sensor to be used for directional control of projectile and also the need for rugged sensors for gun stabilization on moving vehicles.

Although there has been described specific arrangements and methods of a system for measuring rate of rotation in accordance with the invention for illustrating the manner in which the invention may be used to advantage, it will be appreciated that the invention is not limited thereto. Accordingly, any and all modifications, variations for equivalent arrangment falling within the scope of the annexed claims should be considered part of the invention.

What is claimed is:

1. A rotational rate sensor for a vehicle capable of rotation about at least one axis comprising:
   a. a closed container affixed to the vehicle where rotational rate is to be measured;
   b. a low viscosity electrolytic fluid filling said container;
   c. a set of three electrodes comprising two output electrodes and a central electrode placed between said output electrodes inserted through the wall of said container and extending into said electrolytic fluid, said electrodes lying in a plane perpendicular to the axis about which rotational rate is to be measured;
   d. means for applying a voltage to said electrodes to establish an electron current flow therebetween coupled to said electrodes outside said container; and
   e. means for measuring the rate of electron flow between said electrodes thereby permitting a measurement of angular rate to be obtained.

2. The apparatus of claim 1 wherein said closed container comprises a closed annular tubular chamber filled with said electrolytic fluid.

3. Apparatus according to claim 2 and further including a set of bellows mounted on the periphery of said annular chamber whereby said electrolytic fluid can expand in said chamber with temperature changes.

4. Apparatus according to claim 1 wherein said means for applying a voltage and means for measuring electron flow comprise:
   a. a first amplifier providing its output to said central electrode;
   b. a second amplifier having its input coupled to one of said output electrodes;
   c. a third amplifier having its input coupled to the other of said output electrodes;
   d. a first means for summing the outputs of said second and third amplifiers and providing them as a first input to said first amplifier;
   e. a reference voltage providing a second input to said first input amplifier; and
   f. means for determining the difference between the outputs of said second and third amplifiers, said difference being a signal proportional to the rate of rotation.

5. Apparatus according to claim 4 wherein said container comprises an annular tubular chamber.

6. Apparatus according to claim 4 wherein said container comprises a spherical chamber and further including two additional sets of three electrodes disposed respectively in planes mutually perpendicular to the plane containing said set of electrodes, with an additional two sets of voltage applying and measuring means provided for said additional sets of electrodes.

* * * * *